United States Patent
Cabral et al.

(10) Patent No.: US 8,055,365 B2
(45) Date of Patent: Nov. 8, 2011

(54) METHOD FOR CONFIGURING GAS SUPPLY FOR ELECTRONICS FABRICATION FACILITIES

(75) Inventors: Jeremy Michael Cabral, Williamsville, NY (US); Shrikar Chakravarti, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 452 days.

(21) Appl. No.: 12/415,221

(22) Filed: Mar. 31, 2009

(65) Prior Publication Data
US 2010/0249972 A1  Sep. 30, 2010

(51) Int. Cl.
G06Q 10/00  (2006.01)
G05B 13/02  (2006.01)
G06F 19/00  (2011.01)
G06F 17/50  (2006.01)
C25F 1/00  (2006.01)
B08B 5/00  (2006.01)

(52) U.S. Cl. ........ 700/95; 134/1.1; 134/1.2; 134/11; 705/7.21; 700/29; 700/108; 700/174; 703/13

(58) Field of Classification Search ............... 134/1.1, 134/1.2, 11; 705/7.31, 26.2; 700/29, 95, 700/108, 174
See application file for complete search history.

(56) References Cited

U.S. PATENT DOCUMENTS

| | | | | |
|---|---|---|---|---|
| 5,016,663 A | * | 5/1991 | Mase et al. | 134/1 |
| 5,259,922 A | * | 11/1993 | Yamano et al. | 438/720 |
| 5,395,482 A | * | 3/1995 | Onda et al. | 216/73 |
| 5,590,051 A | * | 12/1996 | Yokozawa | 700/266 |
| 5,953,707 A | * | 9/1999 | Huang et al. | 705/7.25 |
| 5,966,312 A | | 10/1999 | Chen | |
| 6,050,283 A | * | 4/2000 | Hoffman et al. | 137/3 |
| 6,175,816 B1 | * | 1/2001 | Flavin et al. | 506/36 |
| 6,643,556 B1 | | 11/2003 | Morenz et al. | |
| 6,665,590 B2 | | 12/2003 | Harada et al. | |
| 6,969,763 B1 | * | 11/2005 | Ecker et al. | 536/24.3 |
| 7,499,766 B2 | * | 3/2009 | Knight et al. | 700/107 |
| 2002/0156542 A1 | * | 10/2002 | Nandi | 700/30 |
| 2003/0115112 A1 | * | 6/2003 | Takeda et al. | 705/26 |
| 2005/0209732 A1 | * | 9/2005 | Audimoolam et al. | 700/216 |
| 2007/0124009 A1 | * | 5/2007 | Bradley et al. | 700/99 |

FOREIGN PATENT DOCUMENTS

EP  0621522 A2  10/1994
WO  WO 2008/019832 A1  2/2008

* cited by examiner

*Primary Examiner* — Albert Decady
*Assistant Examiner* — Thomas Stevens
(74) *Attorney, Agent, or Firm* — Iurie A. Schwartz

(57) ABSTRACT

A system for supplying a reagent to multiple tools in an electronics fabrication facility is configured using a demand probability distribution. In specific examples the reagent is a non-atmospheric or a specialty gas and the demand probability distribution is developed using Monte Carlo statistical techniques. In one embodiment, a method for configuring a reagent supply system for an electronic device manufacturing facility is provided. The method includes (a) collecting representative information for process tools within the fabrication facility which use the reagent; (b) creating a simulation of process tool operation to model an overall demand profile for the process tools; (c) creating a statistical probability distribution of the reagent demand by the process tools using data from the model; and (d) correlating data from the probability distribution with supply system characterization data to configure the supply system.

31 Claims, 8 Drawing Sheets

METHOD FOR CONFIGURING GAS SUPPLY FOR ELECTRONICS FABRICATION FACILITIES

BACKGROUND OF THE INVENTION

Electronic devices such as semiconductors, liquid crystal displays (LCDs), solar cells, light emitting diodes (LEDs) and others are generally produced via batch processes involving many different steps. Device fabrication typically begins with a base-material substrate, e.g., silicon, ceramic, steel, glass and other suitable materials. Various sub-process steps are then carried out upon the substrate in specialized process tools designed to produce, for instance, patterned layers composed of select materials.

Some of the sub-process steps enacted by the process tools, such as, for example, chemical vapor deposition (CVD), etching, or cleaning operations, utilize non-atmospheric or other specialty gases. Mono-silane and ammonia, for instance, often are employed in depositions of silicon-based or nitride-based compounds. Nitrogen trifluoride or fluorine may be used as process tool cleaning agents.

The process tools included within a fabrication facility, also referred to as a "fab", generally operate independently of each other. Systems employed for supplying bulk non-atmospheric or other specialty gases to multiple process tools within moderate or large fabs are commonly centralized.

Non-atmospheric gases used in the production of electronic devices can account for a significant portion of the manufacturing costs associated with producing the device. Therefore a need exists for reducing or minimizing these costs. Since non-atmospheric and specialty gases may be critical to the fabrication process, a need also exists for reliable supply systems and techniques that provide unrestricted gas availability to satisfy the demands of the fab.

SUMMARY OF THE INVENTION

The invention generally relates to a supply system for delivering a reagent employed in one or more processes or process steps conducted in a fab. In specific aspects the reagent is a non-atmospheric gas, i.e., a gas that is not derived from air, employed in fabricating electronic devices.

Embodiments of the invention provide for the creation of a gas-demand model for a fabrication facility or fab, which is used to estimate the facility's gas requirements and to configure a gas supply system. A Monte Carlo technique or other suitable method is used to develop a statistical distribution of the overall demand model for multiple tools that utilize the reagent within the fab. For instance, a large number of models are generated with randomly varied inputs and the resulting data is correlated or coordinated with supply system characterization data to determine the optimum system configuration for the fabrication facility.

In one aspect of the invention, a method for configuring a reagent supply system for an electronic device manufacturing facility is provided. The method includes (a) collecting representative information for process tools within the fabrication facility which use the reagent; (b) creating a simulation of process tool operation to model an overall demand profile for the process tools; (c) creating a statistical probability distribution of the reagent demand by the process tools using data from the model; and (d) correlating data from the probability distribution with supply system characterization data to configure the supply system.

In another aspect of the invention, a system for supplying a reagent within an electronics fabrication facility is provided. The system includes, (a) generating an overall reagent demand model for multiple process tools that utilize the reagent in the electronics fabrication facility; (b) repeating step (a) to compile a statistical probability distribution for reagent demand by the multiple process tools; and (c) configuring a reagent supply system to meet a reagent demand predicted by the statistical probability distribution, thereby obtaining the system.

The invention can be practiced in designing new supply systems for electronics manufacturing facilities or in retrofitting or refurbishing existing ones. The method disclosed herein provides a rigorous and intuitive approach to estimating these requirements, whereas the current and commonly used practices inherently overestimate the demand requirements of a fabrication facility. Additionally, embodiments of the invention provide an overall conception of fab operation with regard to reagent usage. Data extracted from this model can describe the probability of sustained peak demand and sustained minimum demand with increased confidence.

Practicing the invention allows a supply system to be configured for distribution of a reagent throughout a fabrication facility such that the supply system is not oversized, yet is capable of meeting the overall reagent requirements of all process tools within the facility in an on-demand fashion.

In many embodiments, the approach for configuring a centralized supply and distribution system can be conducted in the absence of historical data or knowledge regarding the fabrication facility. Thus aspects of the invention reduce or eliminate the guesswork and uncertainties associated with design margin factors employed in conventional sizing techniques. In contrast to conventional methods, approaches described herein rely on a rigorous determination of the potential range of the facility demand and its associated probability, and not on an arbitrary approximation of a design margin factor which may over or under estimate the demand of the facility. Aspects of the invention also can provide information useful for facility planning in relation to yearly reagent usage.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
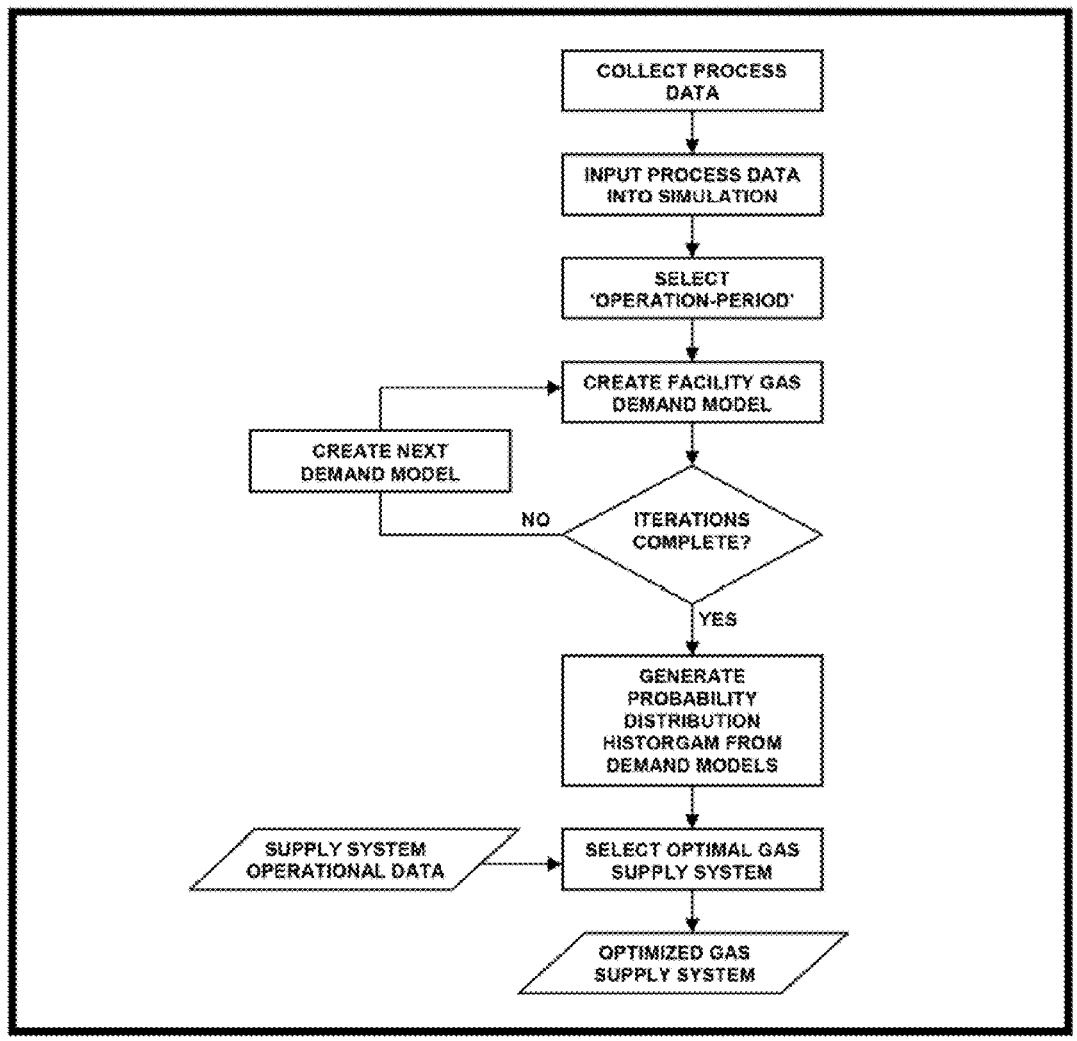
FIG. 1 is a process flow diagram of a base algorithm for optimally configuring a supply system.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

The invention generally relates to a supply system that delivers a reagent employed in a manufacturing facility. Reagents typically are compounds that participate in a process. Some, e.g., reactants, are consumed, while others, e.g., solvents, catalysts, and so forth, can be discarded or collected during or at the end of a process cycle and, in some cases, re-used.

In many aspects, the invention relates to sizing, designing, selecting and/or modifying a supply system and, optionally, processes and arrangements that include the system. As used herein, the term "sizing" refers to determining the capacity and/or dimensions of a process or apparatus and can apply to the selection of a specific system, arrangement or process from standard designs or procedures, as well as to custom building or developing new systems or process arrangements. Sizing, designing, selecting and/or modifying a supply system, arrangement or process according to embodiments of the invention are referred to herein as "configuring" and can be applied in developing new facilities or in retrofitting or modifying existing ones.

In illustrative embodiments, the reagent is a fluid, and, in the specific implementations described below, the reagent is a non-atmospheric gas utilized in an electronics fabrication facility, also referred to herein as "fab". Examples of non-atmospheric gases, i.e., gases that are not derived from air, employed in producing electronic devices include, but are not limited to, ammonia, silanes, e.g., mono- or di-silanes, partially or fully halogenated silanes, halogen gases, halides, e.g., boron trihalides, silicon hexafluoride, tungsten hexafluoride, halogenated hydrocarbons, phosphine, and many others. Aspects of the invention can also utilize other fluids, e.g., other specialty gases, or fluids such as supercritical fluids, used, for instance, as solvents in wafer cleaning operations.

An electronics fab may use multiple supply systems, each supply system providing a single centralized source for a reagent. Supply systems include equipment associated with providing a reagent, e.g., a non-atmospheric gas, at the fab site. Supply systems can include on-site storage or generation equipment, piping, controls, pumps and so forth, as known in the art. As used herein, the terms "a plurality" or "multiple" refer to two or more articles. Two or more supply systems dedicated to delivering the same reagent may also be employed. Aspects of the invention can be practiced with any or all of the reagent supply systems found in a fabrication facility.

Typically, the reagent is directed from a source, e.g., the supply system discussed above, to equipment, also referred to herein as "tools" or "process tools", via a "distribution system" or "distribution network". A typical distribution network includes equipment suitable for delivering the reagent from the supply system to specific tools and it can also include equipment for collection or rejection of spent reagent, for recycle, purification and other operations typically carried out during the manufacturing process. Equipment that can be used to construct a distribution network may include, for instance, piping, flow meters, controls, valves, pumps, compressors and other suitable means for transporting fluids in a manufacturing facility.

Process tools employed in a fab generally are designed to conduct specific portions, or "sub-processes" of the overall production scheme employed to manufacture an electronic device, e.g., a certain type of LED. The tools often perform batch operations where a discreet number of electronic devices are processed for a defined period of time. At the end of a batch process cycle, the devices are passed to another tool where the next process is performed upon the devices, and so on. Accordingly, a fabrication facility typically employs different types of tools, designed to carry out different sub-processes. For increased capacity, fabs also can have multiple tools performing the same sub-process.

Process reagents are generally used by individual process tools according to a process "recipe". The recipe is a predetermined usage pattern where the reagent flow is specifically modulated or controlled throughout the duration of the sub-process. Recipes often are segmented into steps. The steps may be demarcated, for instance, by changes in flow requirements. For example, during a sub-process, the magnitude of the flow may be increased, decreased or entirely stopped. After a distinct change in flow, the flow magnitude can be sustained for a specified period of time, after which it can undergo another change. Recipes may vary by the type of process tool or the type of article being processed, and therefore tools within a fab may use distinctive and unique recipes.

Within a fab, many of the process tools that use a specific reagent will tend to operate on independent and unique schedules in order to optimize production throughput. Specific process recipes may require changes in flow from very low levels to very high levels. Furthermore, recipes often are unique to a specific device manufacturer, and/or to the types of product or types of process tools employed in the fab. Since process tools tend to run independently, preferred supply systems are those able to meet the highly variable overall demand of the fabrication facility.

The variability of a process recipe combined with the independent and nearly random operation of process tools creates potentially wide variability in the overall demand requirements for a fab. A preferred supply system must be capable of meeting rapid changes in demand created by this variability.

One common technique used to estimate requirements at an electronics fab is an additive method which combines the peak demand for each process tool in the fab to determine the absolute maximum demand for the fab. The method may be described by Equation (1):

$$\text{Maximum Flow} = \text{Peak Flow}[1] + \text{Peak Flow}[2] + \ldots + \text{Peak Flow}[n] \tag{1}$$

An additional design factor, often referred to as a "margin" typically in units of percentage may be applied to the maximum flow of Equation (1) to further ensure that a supply system can meet the fab demand at all times. The resulting estimated demand for the fab is described by Equation (2):

$$\text{Estimated Fab Demand} = (\text{Maximum Flow}) \times (1 + \text{Margin}) \tag{2}$$

A supply system configured on the basis of Equations (1) or (2) meets the calculated maximum demand flow (and can also include a design margin factor), at any time and for an indefinite period of time. Although this approach ensures that a supply system will not be undersized and will reliably supply the needs of the fab, it generally leads to selecting systems that are oversized, adding to the manufacturing costs of each electronic device being produced in the facility.

A drawback of the approach described above is the assumption that the maximum demand for each process tool will occur simultaneously. However, process tools within a fabrication facility typically operate independently of each other, with no coordinated scheduling of peak flow times, shut-down or zero-flow times. This mode of operation leads to a dynamic and variable overall demand pattern for the fab, while the actual probability of encountering a sustained overall demand peak as defined by equations (1) or (2), is very low.

An alternative approach sometimes practiced is based on determining an overall average demand for the fab. The average demand of each process tool in the facility are added as illustrated in Equation (3):

$$\text{Average Flow} = \text{Average Flow}[1] + \text{Average Flow}[2] + \ldots + \text{Average Flow}[n] \quad (3)$$

Once the overall average flow is determined, a "margin" or "safety factor" often a percentage, is approximated, then used to calculate an adjusted flow demand, as exemplified by Equation (4):

$$\text{Adjusted Flow} = \text{Average Flow} \times (1 + \text{Margin}) \quad (4)$$

The margin is typically estimated based on experience and/or knowledge of the overall operation of a specific fabrication facility.

The approach set out in Equations (3) and (4) may reduce the tendency to oversize associated with the approach illustrated by Equations (1) and (2), providing results that are more optimized toward an average demand of the fab. However the use of a somewhat arbitrary value for the design margin, creates an unknown relationship between the predicted and actual demand patterns, thereby increasing the risk of over or under-sizing the supply system. Furthermore, generating an estimate of the "margin" can be difficult in the absence of historical data adding to the overall uncertainty of the adjusted flow calculated in Equation (4), for example, a new or newly retrofitted plant.

Aspects of the present invention provide distinct improvements on the current and commonly used practices by accounting for the dynamic and variable nature of the process tools in a fab. Due to the nature of the sub-processes and recipes employed in a fab, process tools typically operate on separate and loosely defined schedules. Embodiments of the invention address the specific demand requirements of each individual tool in a fab, with all these demands being accounted for by using information directly related to the process tool and its operation. These requirements are compiled into a probabilistic model which is used to configure supply systems and/or process arrangements for an entire facility or section thereof.

Several factors impact the configuration of a reliable reagent supply system including: high volume demand; highly variable demand; and reliability of supply.

In one embodiment, the invention relates to a method for configuring, e.g., sizing, a reagent supply system for an electronic device fabrication facility (fab) which includes: (a) collecting representative information regarding process tools within the fabrication facility which use the reagent; (b) creating a simulation of process tool operation to model the overall demand profile for the facility; (c) creating a statistical probability distribution of the facility demand using data from the model; and (d) coordinating the probability distribution data with supply system characterization data to determine or select the optimum supply system for the particular fab.

Representative information regarding process tools can include one or more of the following factors: (i) the number of process tools using a specific reagent; (ii) the type of process tools using the reagent, e.g., manufacturer and model specification; (iii) the recipe for each process tool with respect to the reagent, e.g., reagent flow vs. time; (iv) an approximation of the frequency with which the tool operates on its defined process recipe; and so forth.

In specific embodiments of the invention, a large number of independent models of the fab's demand are created with randomly varied aspects. The models provide representations of the varied potential operating modes of the overall fabrication facility. All of the models are compiled to create an overall demand probability distribution and this resulting probability distribution can be compiled and analyzed, e.g., statistically, to estimate parameters, such as, for instance, peak flow, sustainable flow, time between peak flows and others. This data can then be employed to configure a supply system, a supply and distribution arrangement or a delivery process employed by the facility.

In preferred implementations, a demand probability distribution is developed using a Monte Carlo statistical technique. Monte Carlo methods are known in the art and generally relate to computational algorithms that rely on repeated random sampling to compute their results. In many cases, Monte Carlo techniques are used to define a domain of possible inputs; use the domain to generate random input values; use these values to perform computations; and aggregate the results of the individual computations into a final result.

In specific aspects of the invention, the demand probability distribution is developed using the process flow diagram of a base algorithm shown in FIG. 1.

A facility demand model can be developed by collecting process operation and specification data. For instance, process tools or other equipment within the fab that periodically or regularly draw a specific reagent can be surveyed to collect relevant data for the development of the demand model. This data may include: the inventory of process tools using the reagent (number of tools, manufacturer, model, etc.); the process "recipe(s)" that each tool may employ for the reagent it is using, e.g., flow vs. time data; the frequency with which the tool operates on its defined process recipe. Representative information regarding process tools can also be obtained from personnel at the fab, facility or process schematics, or other sources.

These data are input into a facility demand model for the development of a probability distribution depicting the facility's potential demand. In accordance with Monte-Carlo techniques, multiple models of the facility are generated to develop a large pool of data from which a statistical probability distribution may be created.

In preferred embodiments, each model is created by mapping the process recipes for each tool in the fab which utilizes the reagent to a simulated time-period of operation. This "operation period" preferably is of sufficient duration to include multiple process runs, since typically tools cycle through their process repeatedly as new batches of substrate are readied. The operation period can be selected to depend on the length of time required to capture a number of consecutive process runs in the model. In preferred implementations, the period encompasses a sufficient number of process runs to illustrate the impact of the independent operation of the process tools, as multiple tools place simultaneous demands on the supply system. A sufficient operation period may range, for example, from about 24 hours to about 168 hours (1 to 7 days) and a typical operation-period can be about 48 hours. Shorter or longer operation periods also can be selected.

Figure 2:
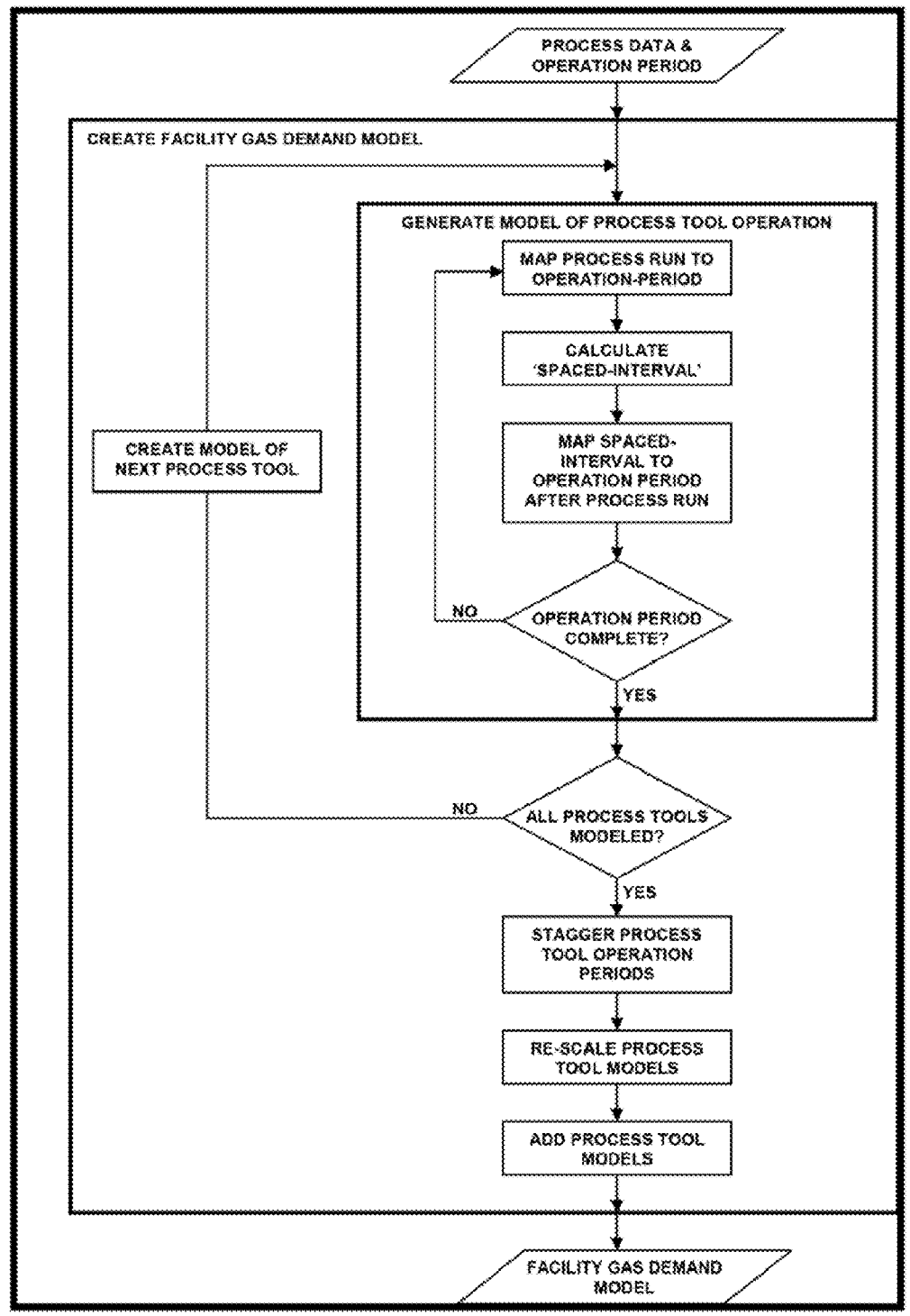
FIG. 2 is a process flow diagram illustrating an algorithm used to generate a facility demand model.

Once the operation period has been determined, a facility demand model is created for that period. FIG. 2 illustrates a process-flow diagram of the algorithm used to generate a demand model.

Figure 3:
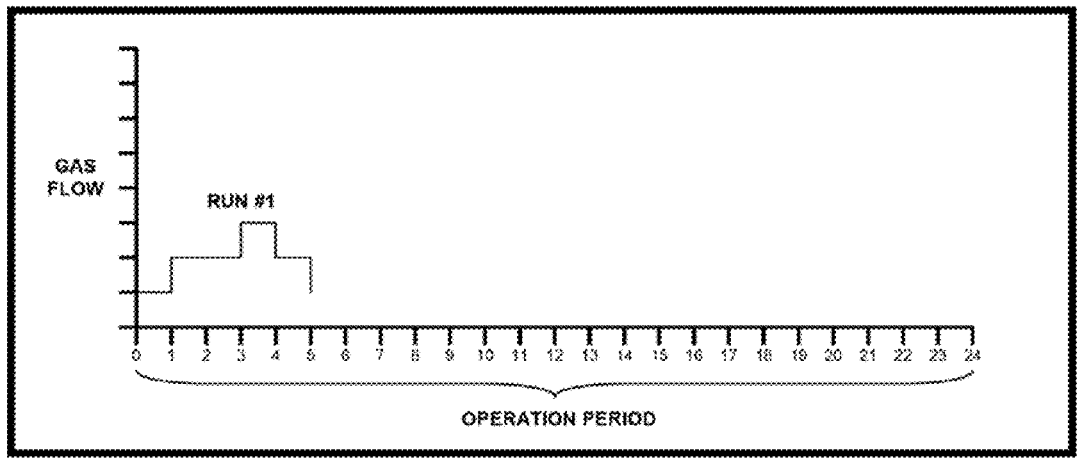
FIG. 3 is an example plot of a single process run mapped to a 24 hour operation-period.

The collected process data can be used to generate a time-series map of a first process run for a first process tool. FIG. 3 illustrates an example of a mapped process run on the selected operation period. In this example the process tool recipe is mapped to a 24 hour operation-period.

In most cases, the increments of time used to map the profile to the operation-period may be minutes. Smaller or longer intervals, e.g., seconds or hours, may be used as appropriate to the facility and or tools being modeled. Generally, smaller increments of time yield more data points and thus a finer probability distribution. For illustration purposes, the example shown in FIG. 3 employs hourly time increments.

After the first process run is mapped to the operation period, a "spaced-interval" is mapped to the period. The spaced-interval is the time period from where a previous process run is concluded, and a new run begins. The duration of the spaced-interval is randomly selected between a time value of 0 and an upper bound based on the average number of process runs. The randomization aspect of this calculation simulates the independent and varied operation of the process tools.

The upper bound of a spaced-interval may be calculated using equation (5):

$$\text{Maximum spaced interval} = ((\text{frequency} * \text{duration}) - \text{time period})/\text{frequency} \quad (5)$$

The next process run is then mapped to the operation period following the spaced-interval. The spaced-intervals are re-calculated and alternately mapped following process runs using different spaced-intervals throughout the operation-period.

Figure 4:
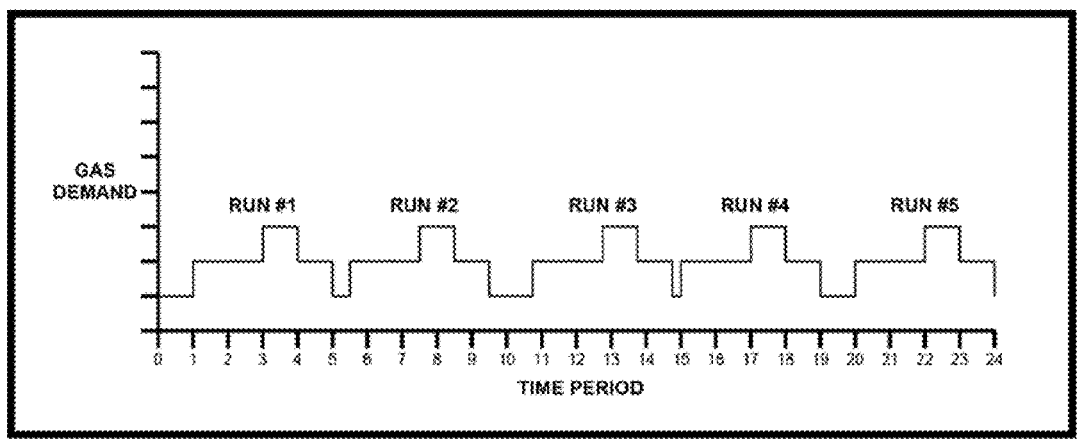
FIG. 4 is an example plot of a completed demand model for a single process tool in its operation-period where randomly calculated spaced-intervals separate each consecutive process run.

FIG. 4 illustrates an example of a completed demand model for a single process tool in its operation-period where randomly calculated spaced-intervals separate each consecutive process run.

Figure 5:
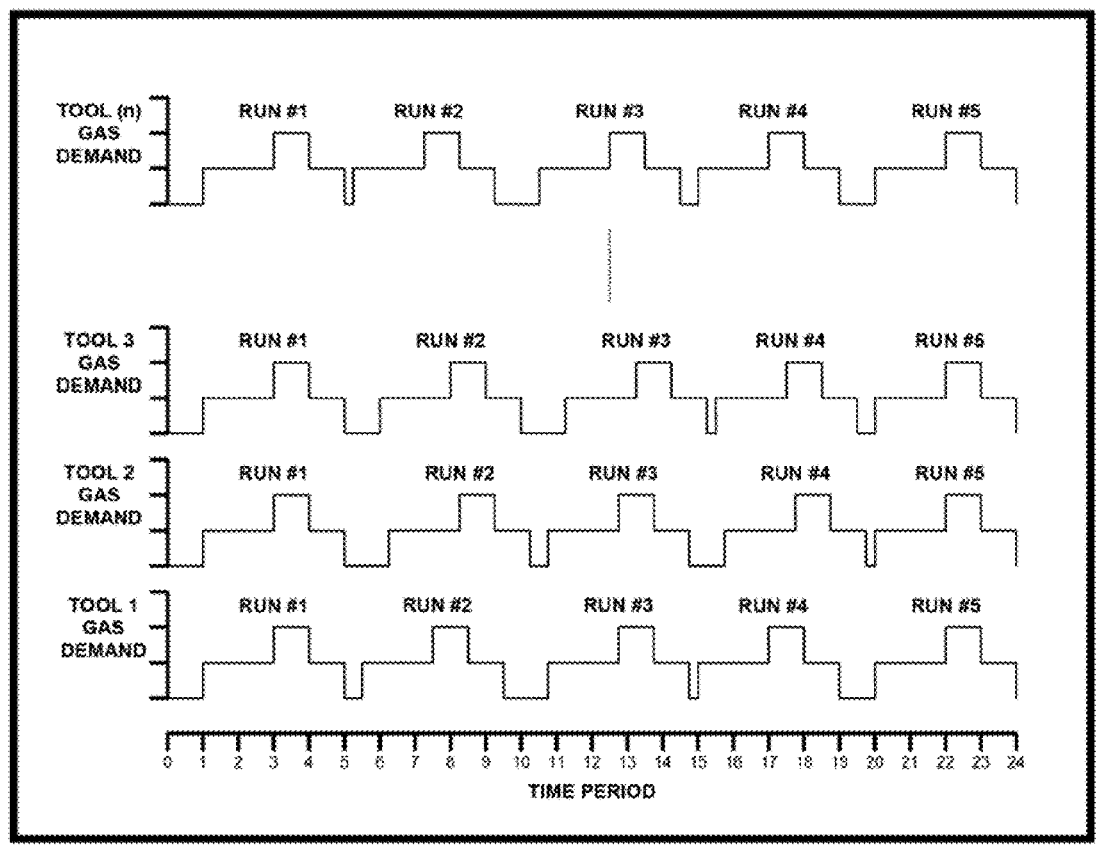
FIG. 5 is an illustrative series of plots of independent demand models for multiple process tools within a fab.

The process is repeated, simultaneously or sequentially, to generate independent demand models for other process tools within the fab using the same reagent, as shown in FIG. 5.

Figure 6:
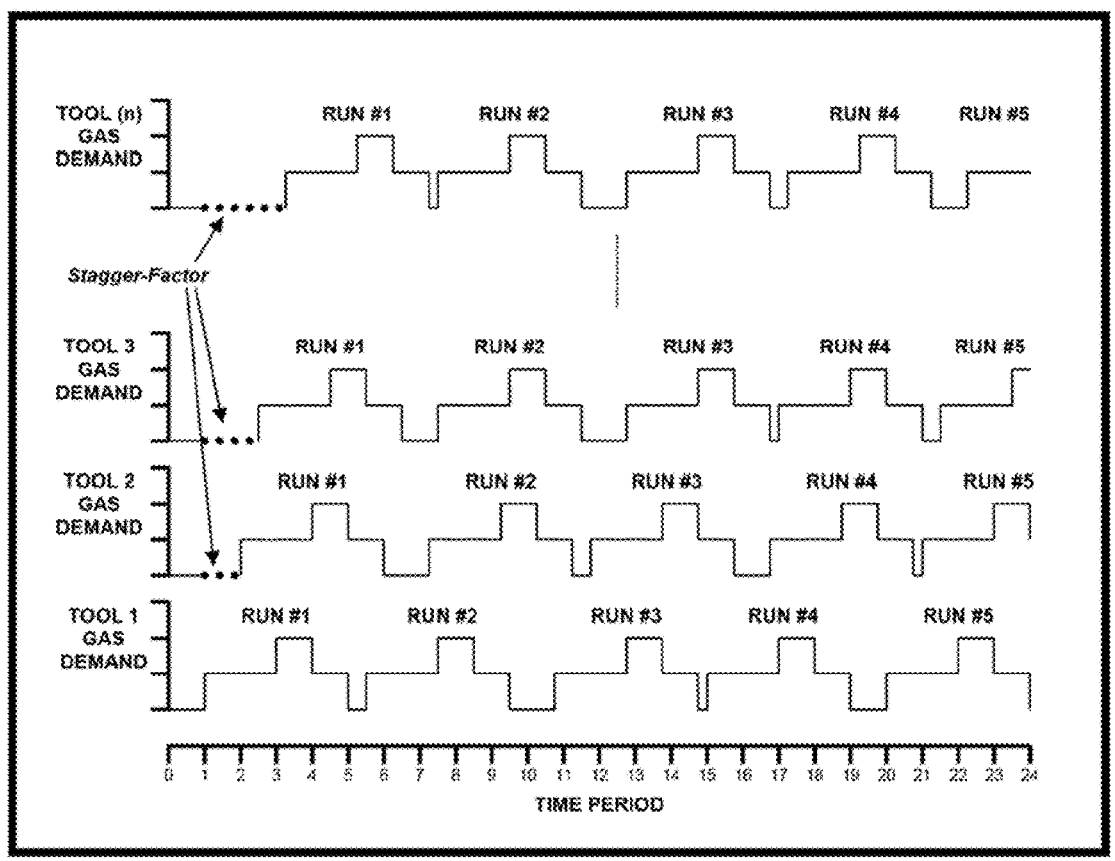
FIG. 6 illustrates a random shifting of each model, accounting for a random staggering of the tools within a fabrication facility.

After models have been created for each tool, e.g., Tool (1) through Tool (n), a stagger-factor can be applied to each model in order to simulate their independent operation. This factor shifts the start of each model such that the tools do not all start simultaneously at time=0. This allows each model to appear as a snapshot of a possible time period of operation. The stagger-factor is applied as a random number selected using the duration time for a single run for the tool. The duration is used as the upper bound of the selection range for the random number; 0 can be used as the lower bound. This value is added to the beginning of the demand model for the first process tool model so that the entire profile is shifted by the random value. Thus the first run in the model begins at the time associated with the random value that was generated. For the next process tool model, a new stagger factor is selected and then added to the previous stagger factor, and so on. The total stagger factor of the first model is added to the beginning of the second model. The process is repeated until all of the models have been shifted with respect to each other. This random shifting of each model allows the random staggering of the tools within a fab relative to each other to be simulated as shown in FIG. 6.

Figure 7:
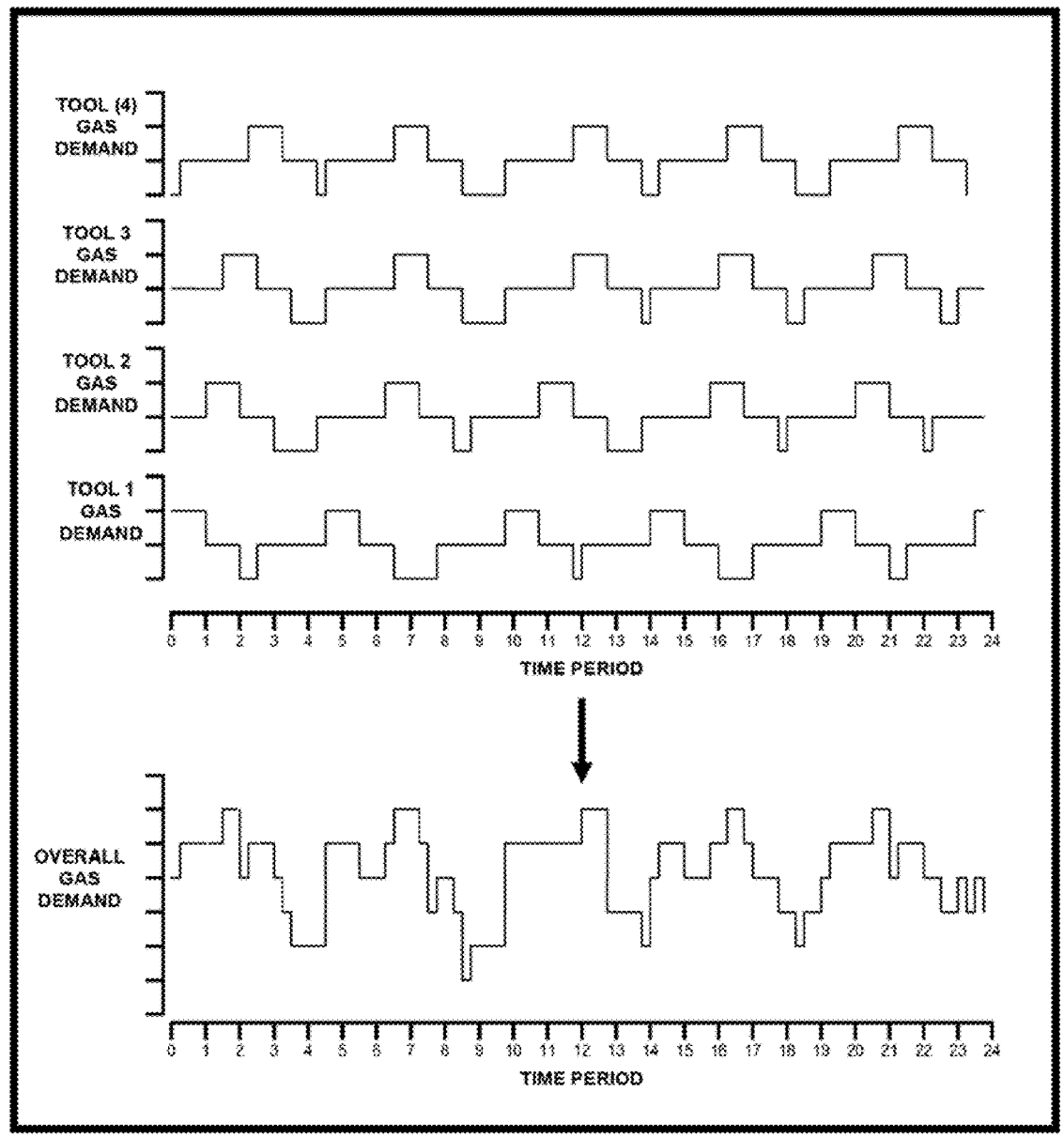
FIG. 7 shows demand profiles for exemplary tools, compiled into an overall demand profile, providing a hypothetical model of the overall demand for the fab throughout a specified time period.

The models are compiled into a single overall or aggregated demand profile. In one example, the instantaneous demand for each tool at corresponding time-intervals are added and mapped to a comprehensive overall demand profile. For instance, the instantaneous demand for a first process tool from the period of 1-2 minutes is added to the instantaneous demand for a second tool from the period of 1-2 minutes, which is added to the demand for a third tool, and so forth. The resulting overall demand profile provides a hypothetical model of the overall demand for the fab throughout the specified time period, as shown in FIG. 7.

The information generated using a single model of a facility may not effectively capture the potential reality of its operation. Therefore, the entire process is repeated, sequentially or simultaneously, to create a large number of distinctly different overall demand profiles. According to Monte-Carlo techniques, for example, generating a large number of demand profiles increases the available pool of data and provides a more comprehensive view of the fab's operation. The number of overall demand profile iterations can range from one to several thousands and acceptable results typically can be obtained by re-iteration of the process to generate a number of demand profiles in the range of 250 to 5000 and often in the range between 250 and 1000 iterations.

The pool of data may be processed into a probability distribution for use in configuring a supply system. The information provided by the probability distribution is utilized to configure the reagent supply system and preferably a most appropriate or optimized reagent supply system for the fab. For instance, the system can be sized or selected by considering the probability of extreme maximum and/or minimum flows predicted by the statistical distribution described herein. In some implementations of the invention, the reagent supply system is configured to meet a facility demand within a chosen number, e.g., 1 to 6 or preferably 1 to 4 of standard deviations of the median demand flow.

In many cases, the information provided by the probability distribution is coordinated or correlated with supply system specifications and capabilities to determine the most appropriate supply system size, design and/or supply system modifications for the specific fabrication facility being addressed. Supply system characterization data may include maximum flow capability, e.g., for a defined time periods; sustainable flow, e.g., indefinitely sustainable flow; ability to respond to changes, e.g., sudden or instantaneous, in demand and others. These and similar supply system characterization parameters are well understood by those skilled in the art.

Supply system characterization data can be developed empirically, via laboratory testing. For example, non-atmospheric supply system performance data can be collected over a period of time for later coordination with the overall fab demand model to select the appropriate size and configuration for a supply system. Some or all supply system characterization data also can be provided by a manufacturer or can be calculated using suitable models and/or experience.

The use of the statistical probability model described above allows the supply system to be chosen with consideration for the probability of extreme maximum or minimum reagent flows being required for the fab.

A supply system, for instance, can be configured to take into account the maximum flow demand predicted by the probability model. A design margin may be added, resulting in a supply system configured to have a somewhat larger capacity than that predicted by the model.

In some embodiments of the invention, a supply system is configured not to substantially exceed the maximum demand predicted by the model described above. In other embodiments, the supply system does not exceed the maximum demand predicted by more than a design margin factor. In further embodiments, a supply system might be selected to meet the facility demand within a chosen number of standard deviations of the median demand flow predicted by the model.

If desired, a similar approach can be employed to configure a supply system for providing reagent to some yet not all of the process tools utilizing the reagent within the fab.

The capacity of the supply system can affect the configuration, e.g., size and/or design of the distribution system. Accordingly, some embodiments of the invention are applied to configuring arrangements that includes a supply as well as a distribution system. In some cases, the two can be provided as an integrated arrangement.

Furthermore, configuring the supply system and, optionally, the distribution system can be part of implementing an overall delivery system and/or process throughout a facility, and can be used in implementing new construction, facility renovations or retrofittings.

Below are non-limiting illustrations of the probability distribution model for an exemplary electronics fab.

EXAMPLE A

In this example, a fab hosts 15 process tools which use the same reagent, in this case a non-atmospheric gas. Each tool operates 4 runs per day and all of the tools utilize a process recipe that includes steps 1 through 3, as shown in Table 1. The tools operate on independent schedules.

TABLE 1

| Process Step | Time | Gas Demand |
| --- | --- | --- |
| 1 | 120 min | 30 l/min |
| 2 | 60 min | 70 l/min |
| 3 | 60 min | 40 l/min |

Using the current and commonly used method for sizing a gas supply system as illustrated by Equation (1), above provides:

Maximum Flow=Peak Flow(1)+Peak Flow(2)+ . . . +Peak Flow(15)

In this example, the peak flow for each of the 15 tools is 70 liters per minute and therefore the maximum flow for all 15 tool is (70 l/min)×15 or 1050 l/min.

The calculated maximum value of 1050 l/min assumes that all 15 of the process tools in the fab will operate on synchronized schedules. In this case the maximum flow occurs only 17% of the day. Additionally, since the tools operate independently, it is quite likely that this percentage is much less.

A probability distribution was calculated according to embodiments of the invention using computer software developed according to the algorithm shown in FIG. 1. Spaced intervals and stagger factors were generated by the software according to the equations provided.

First, a gas demand model for the 15 tools was generated using the gas flow parameters described above. An operation period of 24 hours and time units of minutes were selected.

Figure 8:
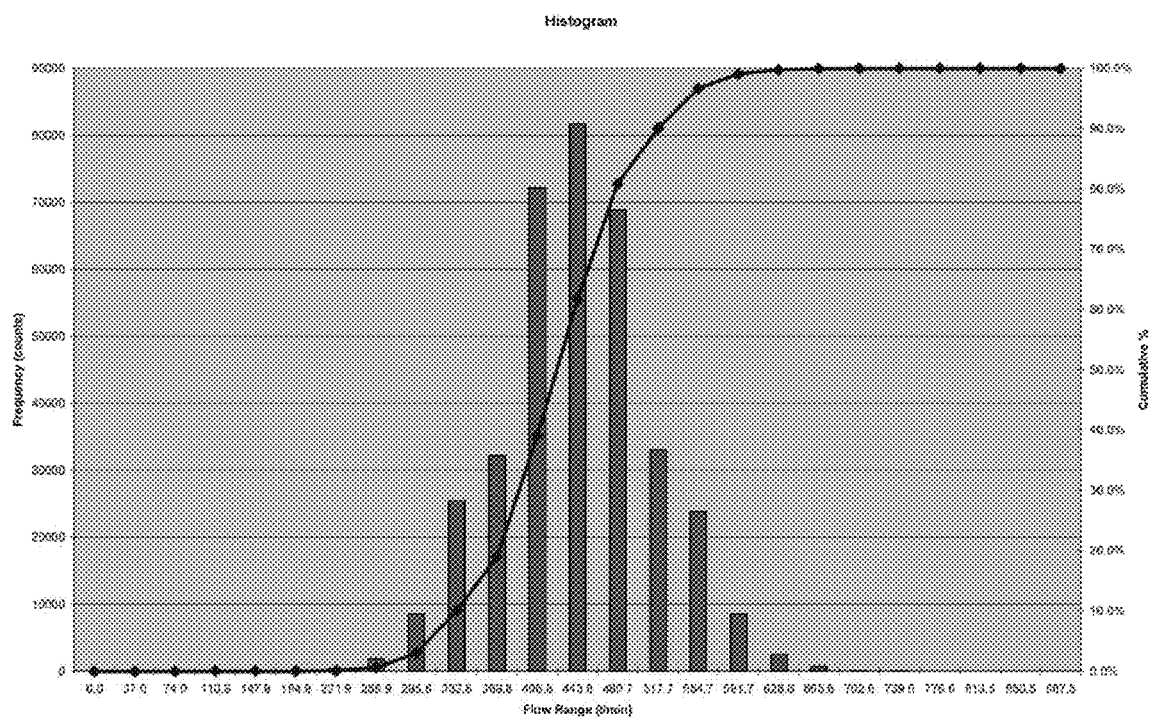
FIG. 8 is a histogram representing the simulation output described in Example A.

The number of iterations executed on the gas demand model was 250, resulting in the simulation output data presented as a histogram in FIG. 8. Alternatively, the probability distribution can be displayed in table format as shown in Table 2:

TABLE 2

| Flow Range (l/min) | Frequency (counts) | Cumulative (%) |
| --- | --- | --- |
| 0.0 | 0 | 0.0% |
| 37.0 | 0 | 0.0% |
| 74.0 | 0 | 0.0% |
| 110.9 | 0 | 0.0% |
| 147.9 | 0 | 0.0% |
| 184.9 | 0 | 0.0% |
| 221.9 | 340 | 0.1% |
| 258.9 | 1820 | 0.6% |
| 295.8 | 8592 | 3.0% |
| 332.8 | 25500 | 10.1% |
| 369.8 | 32172 | 19.0% |
| 406.8 | 72124 | 39.0% |
| 443.8 | 81668 | 61.7% |
| 480.7 | 68848 | 80.9% |
| 517.7 | 33120 | 90.1% |
| 554.7 | 23864 | 96.7% |
| 591.7 | 8592 | 99.1% |
| 628.6 | 2552 | 99.8% |
| 665.6 | 720 | 100.0% |
| 702.6 | 72 | 100.0% |
| 739.6 | 16 | 100.0% |
| 776.6 | 0 | 100.0% |
| 813.5 | 0 | 100.0% |
| 850.5 | 0 | 100.0% |
| 887.5 | 0 | 100.0% |

The data in FIG. 8 and Table 2 indicate an extremely low probability (<0.2%) that the facility demand will exceed 629 l/min, and a 0.0% probability that the facility demand will exceed about 740 l/min. Accordingly, by practicing the invention a gas supply system that can meet the demand of the 15 process tools in the fab can have a capacity that is considerably less than the 1050 l/min calculated using peak flows.

EXAMPLE B

In this example, a fab hosts 15 process tools which use the same non-atmospheric gas reagent. Each tool operates 4 runs per day and all of the tools utilize the process recipe as defined in Table 3.

TABLE 3

| Process Step | Time | Gas Demand |
| --- | --- | --- |
| 1 | 120 min | 30 l/min |
| 2 | 60 min | 70 l/min |
| 3 | 60 min | 40 l/min |

The process tools are operated in groups of 5 where the tools within each group will operate in a coordinated fashion such that all 5 will stop and start at the same time. Each of the 3 total groups of process tools operate independently of each other.

Using the current and commonly used method for sizing a gas supply system as illustrated by equation (1):

Maximum Flow=Peak Flow(1)+Peak Flow(2)+ . . . +Peak Flow(15)

Specifically, the maximum flow is (70 l/min)×15 or 1050 l/min

The calculated maximum value of 1050 l/min assumes that all 15 of the process tools in the fab will operate on synchronized schedules. This maximum flow occurs only 17% of the day. Additionally, since in this example the operation of some of the tools is coordinated, it is likely that the probability of reaching this maximum value is much less.

Applying the method described above, a probability distribution is generated using 250 model iterations.

Figure 9:
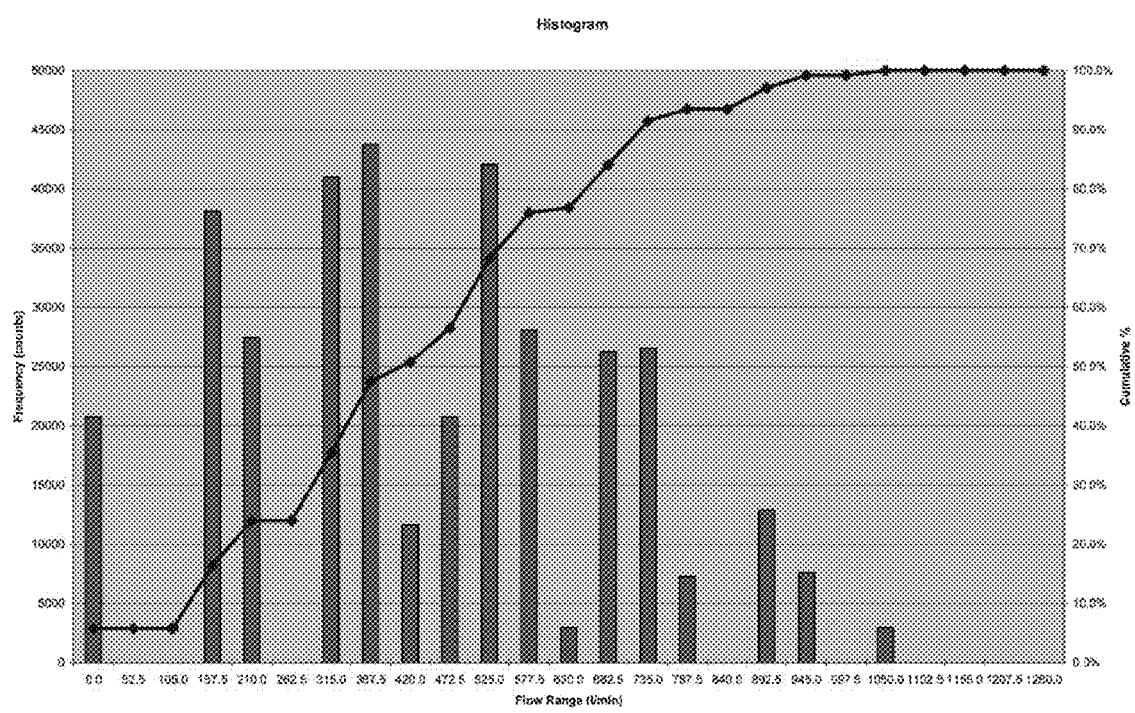
FIG. 9 is a histogram representing the simulation output described in Example B.

FIG. 9 presents a histogram representing the simulation output and these data may be alternatively displayed in table format as shown in Table 4:

TABLE 4

| Flow Range (l/min) | Frequency (counts) | Cumulative (%) |
|---|---|---|
| 0.0 | 20768 | 5.8% |
| 52.5 | 0 | 5.8% |
| 105.0 | 0 | 5.8% |
| 157.5 | 38112 | 16.4% |
| 210.0 | 27476 | 24.0% |
| 262.5 | 0 | 24.0% |
| 315.0 | 41000 | 35.4% |
| 367.5 | 43736 | 47.5% |
| 420.0 | 11624 | 50.8% |
| 472.5 | 20768 | 56.5% |
| 525.0 | 42028 | 68.2% |
| 577.5 | 28068 | 76.0% |
| 630.0 | 2960 | 76.8% |
| 682.5 | 26232 | 84.1% |
| 735.0 | 26552 | 91.5% |
| 787.5 | 7256 | 93.5% |
| 840.0 | 0 | 93.5% |
| 892.5 | 12868 | 97.1% |
| 945.0 | 7592 | 99.2% |
| 997.5 | 0 | 99.2% |
| 1050.0 | 2960 | 100.0% |
| 1102.5 | 0 | 100.0% |
| 1155.0 | 0 | 100.0% |
| 1207.5 | 0 | 100.0% |
| 1260.0 | 0 | 100.0% |

Example B shows that by instituting an operation schedule and creating partial flow-patterning of the tools, a very different result is achieved when compared with example A. In this case, there is a 23.2% probability that the demand will exceed 630 L/min, and around a 0.8% probability that the demand will reach the maximum value of 1050 L/min calculated using equation (1).

The information provided by the probability distribution can be coordinated or correlated with supply system specifications and capabilities to configure the most appropriate or optimized supply system for the fab. For instance, the system can be sized or selected by considering the probability of extreme maximum and/or minimum flows predicted by the statistical distribution described herein. In some implementations of the invention, the reagent supply system is configured to meet the facility demand within a chosen number of standard deviations of the median demand flow. Thus in Example A, the gas supply system could be configured to meet a gas demand within 1 to 6 standard deviations of the median demand flow while in Example B, the gas supply system could be configured to meet a gas demand within 1 to 6, preferably 1-4 standard deviations of the median demand flow.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for configuring a reagent supply system for an electronic device manufacturing facility, the method comprising:
   a. collecting representative information for process tools within the fabrication facility which uses a reagent;
   b. creating a simulation of process tool operation to model an overall demand profile for the process tools;
   c. creating a statistical probability distribution of a reagent demand by the process tools using data from the model; and
   d. correlating data from the probability distribution with supply system characterization data to configure the supply system.

2. The method of claim 1, wherein representative information regarding process tools within the fabrication facility includes: reagent process recipes, number of tools, type of tools or type of process.

3. The method of claim 2, wherein two or more multiple process tools operate on independent schedules.

4. The method of claim 1, wherein the reagent directed to each process tool has a flow demand determined by a recipe for the process tool.

5. The method of claim 1, wherein the simulation of process tool operation is generated by mapping demand profiles for each process tool which uses the reagent.

6. The method of claim 1, wherein the simulation of process tool operation is generated by mapping a plurality of process runs over a specified period of operation.

7. The method of claim 6, wherein consecutive process runs are separated by a randomly selected spaced interval.

8. The method of claim 6, wherein a specified period of operation is selected to encompass one or more process runs.

9. The method of claim 5, wherein each demand profile includes a randomly selected stagger factor, said factor having a duration value between 0 and the duration of a run.

10. The method of claim 9, wherein said randomly selected stagger factor is applied to each demand profile to stagger each profile with respect to one another.

11. The method of claim 1, wherein the demand profiles for the multiple process tools are combined to generate an overall demand model for the multiple process tools.

12. The method of claim 1, wherein the statistical probability distribution of a facility demand is generated by a Monte Carlo statistical technique.

13. The method of claim 12, wherein multiple iterations of an overall demand model are generated to create the statistical probability distribution.

14. The method of claim 1, wherein said supply system is configured to meet a gas demand predicted by a demand probability distribution.

15. The method of claim 13, wherein and said supply system does not substantially exceed a maximum gas demand predicted by a demand probability distribution.

16. A system for supplying a reagent within an electronics fabrication facility, configured by a process comprising:
   a. generating an overall reagent demand model for multiple process tools that utilize the reagent in the electronics fabrication facility;
   b. repeating step (a) to compile a statistical probability distribution for reagent demand by the multiple process tools; and
   c. correlating data from the statistical probability distribution with reagent supply system characterization data to configure the system.

17. The system of claim 16, wherein the overall reagent demand model is obtained by:
   i. simulating a reagent demand profiles for each of the multiple process tools over an operation period; and
   ii. combining said reagent demand and profiles to obtain the overall reagent demand model.

18. The system of claim 17, wherein said reagent demand profiles are combined using a stagger factor.

19. The system of claim 18, wherein the stagger factor is randomly selected.

20. The system of claim 17, wherein an operation period comprises one or more process runs.

21. The system of claim 17, wherein the operation period comprises two or more process runs separated by one or more spaced-intervals.

22. The system of claim 21, wherein the spaced-intervals are randomly selected.

23. The system of claim 17, wherein at least one input for simulating the reagent demand profile for each of the multiple process tools is obtained from a process recipe used in a process run.

24. The system of claim 16, wherein reagent supply system characterization data is selected from the group consisting of one or more of maximum flow capacity, capacity for sustainable flow, and system response to changes in reagent demand.

25. The system of claim 16, wherein the statistical probability distribution is obtained by a Monte Carlo statistical technique.

26. The system of claim 16, wherein step (b) is repeated for at least 250 iterations.

27. The system of claim 16, wherein one or more of steps (a), (b) and (c) are carried out by a computer.

28. A system for supplying a reagent within an electronics fabrication facility, obtained by a process comprising:
   a. generating an overall reagent demand model for multiple process tools that utilize the reagent in the electronics fabrication facility;
   b. repeating step (a) to compile a statistical probability distribution for reagent demand by the multiple process tools; and
   c. configuring a reagent supply system to meet a reagent demand predicted by the statistical probability distribution, thereby obtaining the system.

29. The system of claim 28, wherein the system is capable of supplying a maximum and a minimum reagent demand predicted by the statistical probability distribution.

30. The system of claim 28, wherein the system is capable of supplying reagent within 1 to 6 standard deviations from a median demand predicted by the statistical probability distribution.

31. A method for providing a reagent supply system for delivering the reagent to multiple process tools in a fab, the method comprising:
   a. generating a plurality of model simulations for reagent demand by the multiple process tools over an operation period;
   b. processing the plurality of model simulations to obtain a statistical probability distribution of reagent demand by the multiple process tools; and
   c. configuring the reagent supply system to:
      i. meet a maximum and a minimum reagent demand predicted by the statistical probability distribution, thereby optimizing the reagent supply system;
      ii. meet a median demand predicted by the statistical probability distribution; or
      iii. correlate with one or more reagent supply system characterization data.

* * * * *